United States Patent [19]
Dietrich

[11] Patent Number: 5,727,444
[45] Date of Patent: Mar. 17, 1998

[54] POWER STEERING CYLINDER ASSEMBLY

[76] Inventor: Otto E. Dietrich, 911 W. Jefferson P.O. Box 121, Morton, Ill. 61550-1535

[21] Appl. No.: 603,133

[22] Filed: Feb. 20, 1996

[51] Int. Cl.⁶ ............................................. F15B 11/024
[52] U.S. Cl. ............................................. 91/437
[58] Field of Search ................................. 91/437

[56] References Cited

U.S. PATENT DOCUMENTS

| | | | |
|---|---|---|---|
| 963,091 | 7/1910 | Sundh | 91/437 |
| 1,009,664 | 11/1911 | Hefty et al. | 91/437 |
| 2,069,214 | 2/1937 | Carlson | 91/437 |
| 2,199,681 | 5/1940 | Timm | 91/437 |

*Primary Examiner*—F. Daniel Lopez

[57] ABSTRACT

This power steering cylinder assembly, may replace the cylinder assembly in some present power steering systems, or may be used in a new system. When the oil pressure drops or disappears, in some of the power steering systems in use today, manual steering must be used. The piston is then pushed back and forth in a fluid filled cylinder. The oil in the chamber in front of the piston, must then be pushed through a small opening back to reservoir, and the oil in the chamber in back of the piston must be drawn from the pump. This results in an additional resistance load on the piston. By using the new cylinder assembly when the pressure drops or disappears, the oil will readily circulate from the chamber in front of the piston to the chamber in back of the piston, thereby relieving much of the resistance of the piston as it is being pushed back and forth by manual steering.

9 Claims, 3 Drawing Sheets

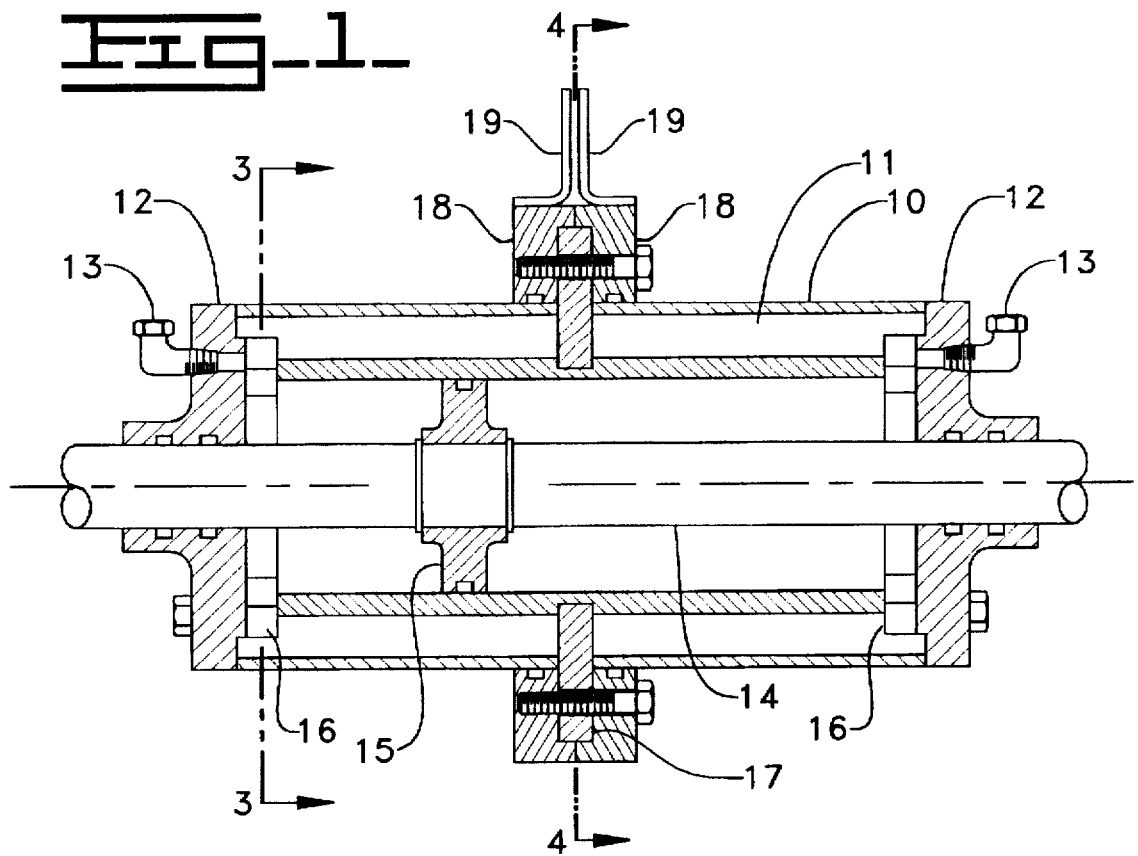
Fig_1_
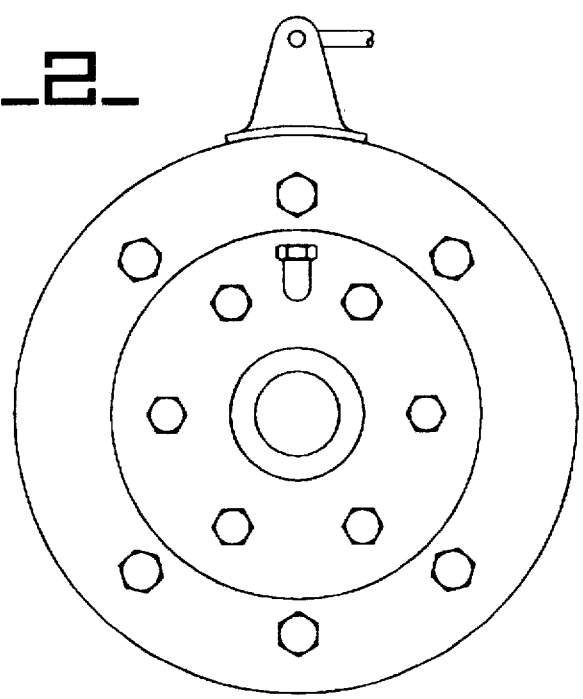
Fig_2_

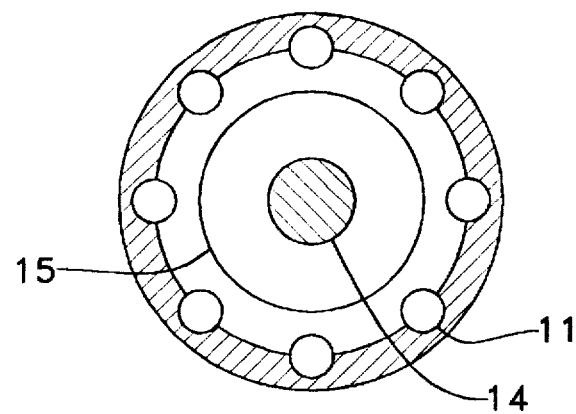
Fig_3_
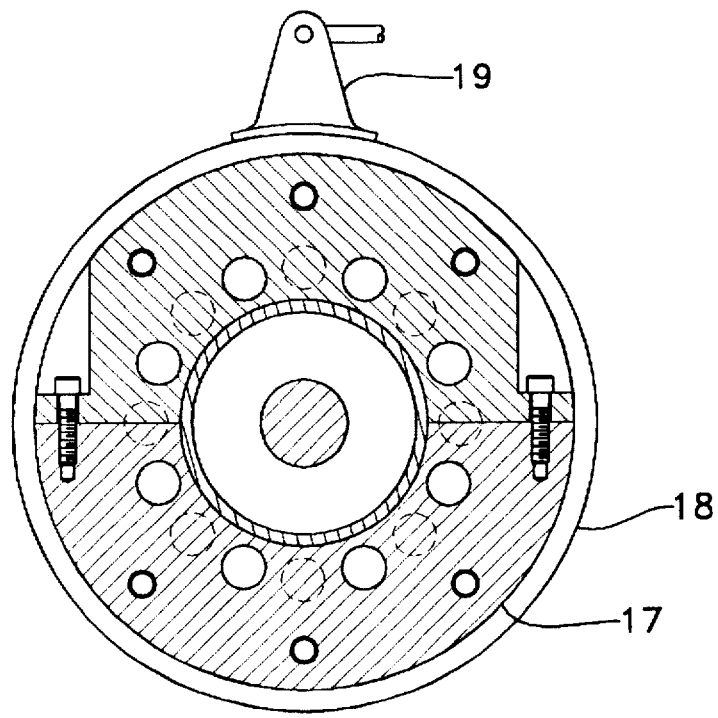
Fig_4_

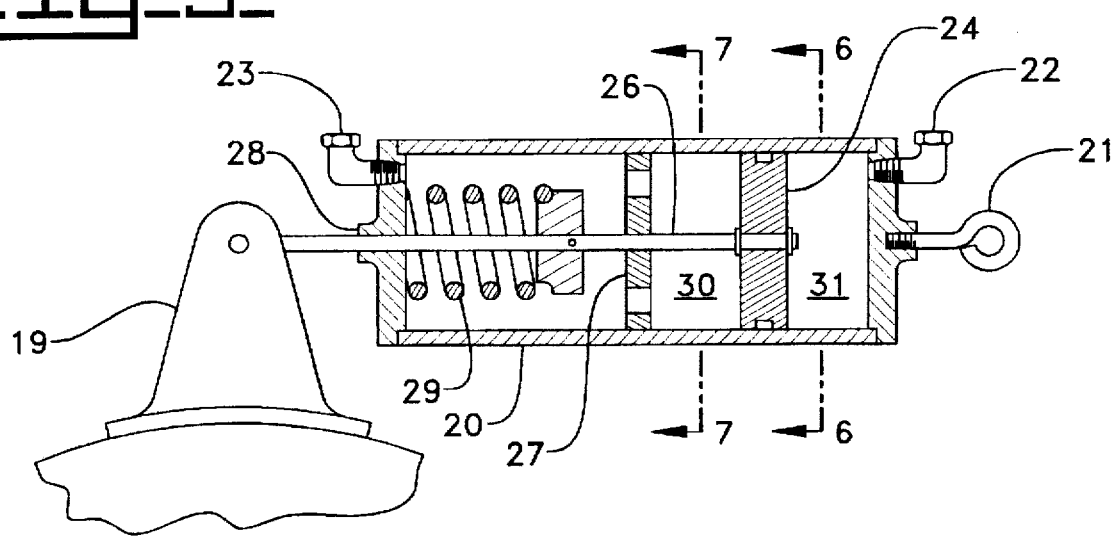
Fig_5_
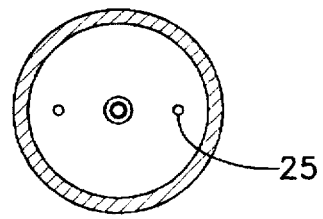
Fig_6_
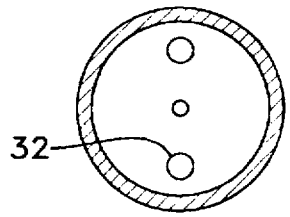
Fig_7_
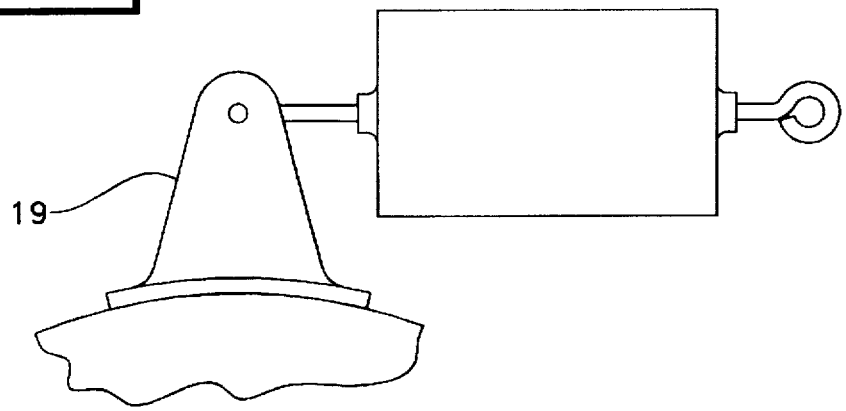
Fig_8_

POWER STEERING CYLINDER ASSEMBLY

BACKGROUND OF THE INVENTION

This invention relates generally to fluid power assisted steering mechanisms as used in automobiles and like machines, more particularly to freeing or greatly reducing the restrictions imposed by the fluid power system, when manual steering is used.

PRIOR ART

Fluid power assisted steering mechanisms have been used very successfully for many years. However a search of issued patents has found only one patent which addresses the problem of power steering mechanisms, when the fluid power fails and manual steering mused be used. This U.S. Pat. No. 4,940,105 issued to Matsunaga et al. on Jul. 10, 1990, describes a complex clutching mechanism which separates the power assistance from the manual effort, so manual steering can be used. In many of the power steering systems being used today, a piston fastened on a rod, which is a part of the steering rod, must travel back and forth in a fluid filled cylinder as the wheels are being steered. If the power system fails when the automobile is traveling in traffic, manual steering must be used. The piston then must be pushed manually back and forth in the fluid filled cylinder. This means that the fluid in front of the piston must be pushed through a small opening back to the reservoir and the fluid in back of the piston must be drawn through a small opening from the pump, which results in an additional effort to be overcome by manual steering.

In view of the above, it would be advantageous to provide a system which would eliminate or greatly reduce the additional effort caused by the piston when it is being manually pushed back and forth in the fluid filled cylinder when manual steering is used.

SUMMARY

This power steering cylinder assembly, which can replace the cylinder in some existing systems, or be used in a new power steering system, is designed to relieve some of the additional load caused by the piston, when manual steering must be used.

BRIEF DESCRIPTION OF THE DRAWINGS

FIG. 1 is a cross sectional view of the cylinder assembly.

FIG. 2 is an end view of the cylinder assembly.

FIG. 3 is a sectional view taken on line 1—1 of FIG. 1

FIG. 4 is a sectional view taken on line 2—2 of FIG. 1

FIG. 5 is a sectional view of the small hydraulic cylinder assembly.

FIG. 6 is a sectional view taken on line 3—3 of FIG. 5

FIG. 7 is a sectional view taken on line 4—4 of FIG. 5

FIG. 8 is a view of the solenoid valve connected to the flat ring valve.

DETAILED DESCRIPTION OF THE DRAWINGS

In FIG. 1 is shown the cylinder 10, with the longitudinal holes 11 through the cylinder wall. The end caps 12, have an opening at 13 for fluid to be drawn in the cylinder or discharged from the cylinder. The rod 14 is the steering rod with the piston fastened to it. At 16 is shown where the longitudinal holes through the cylinder open to the inside diameter of the cylinder. The flat ring valve 17 shown in FIG. 4 is split for assembly purposes and has holes to match the longitudinal holes in the cylinder. The flat rings shown at 18 have oil seals in the inside diameter to completely seal the valve system. These rings form a clamp for the flat valve. The clips 19 are fastened to the clamp 18, to provide an arm where the rod of the small cylinder can be fastened, to rotate the flat valve. An independent cylinder assembly 20 shown in FIG. 5 has a support ring 21 which is connected to the frame of the vehicle. It also has an inlet port at 22 and an outlet port at 23. The piston 24 has bleed holes 25 as shown in FIG. 6 and is fastened to a rod 26 that passes through a baffle plate 27 and the end cap at 28. This connects to the clamp arm 19. A spring 29 is fastened to the rod 26 to provide a return for the piston 24. The baffle plate 27 has holes 32 through it, for the fluid in area 30, to escape to the rear of the cylinder and out at the port 23 and back to the reservoir. The fluid holes 25 in the piston and the holes in the baffle plate are out of alignment, so when the piston is forced by fluid pressure against the baffle plate, the holes 25 are sealed, to prevent the fluid in area 31, under pressure, to escape. In FIG. 8 is shown an electrical solenoid which can be used instead of the cylinder assembly 20. It would perform the same function as the hydraulic cylinder assembly, by using electricity instead of fluid power.

OPERATION

When the engine is started and the pump builds up pressure in the line, the piston in the small cylinder will immediately travel to the baffle plate, pushing the fluid out of the port 23 and back to the reservoir, at the same time compressing spring 29. By this action the rod 26, connected to the piston and clip arm 19 will cause the valve plate to rotate and close the passages in the wall of the cylinder assembly 10. The power steering will then operate in the normal manner. When the engine stalls, or the fluid pressure drops, the small piston under spring pressure, will return as the fluid passes through the bleed holes 25, thus opening the passages in the wall of the cylinder assembly 10, so the piston 15 can circulate the fluid as it is being pushed back and forth by the manual steering effort. In FIG. 8 is shown another version of the flat valve operation. An electrical solenoid is connected to the clip arm 19 to rotate the flat valve 17. When this solenoid is used and the engine is started, an electrical hookup will energize the solenoid to rotate the flat valve 17 and close the passages in the cylinder wall, so the system can operate in the normal manner. However when the electricity is cut off, as when the engine stops, the solenoid will return the flat valve to open the passages so the piston 15 can circulate the fluid as it is being pushed by the manual effort.

I claim:

1. An actuator comprising:
   (a) a housing having two end portions and an internal chamber;
   (b) a piston slidable within said housing and dividing said chamber into operating chambers;
   (c) a piston rod fastened to said piston and passing through each of said end portions;
   (d) fluid openings in each of said end portions for allowing fluid to enter or exhaust from said operating chambers to move said piston;
   (e) fluid passage means in said housing for allowing fluid to circulate through said housing, said fluid passage means comprising axial bores extending parallel to an axis of said piston rod and openings in said end portions connecting said bores with said operating chambers; and (f) rotatable valve means for preventing fluid to circulate through said fluid passage means, said rotatable valve means comprising a flat ring mounted to said rotatable with respect to said housing, said flat ring having bores which match said axial bores.

2. An actuator as recited in claim 1, and further comprising a control actuator for rotating said rotatable valve means.

3. An actuator as recited in claim 1, and further comprising that said control actuator is an electrical solenoid.

4. An actuator as recited in claim 2, and further comprising that said control actuator is a hydraulic cylinder including a control rod extending out of one end of a cylinder and connected to said rotatable valve means.

5. An actuator as recited in claim 4, and further comprising that said cylinder has a first opening in said one end for allowing free inlet and discharge of fluid; and a second opening in an opposite end for allowing fluid under pressure to enter one of said operating chambers.

6. An actuator as recited in claim 5, and further comprising a control piston slidably mounted within said cylinder, said control piston being connected to said control rod and having through bores for fluid flow through said piston.

7. An actuator as recited in claim 6, and further comprising a baffle plate mounted in said cylinder and spaced apart from said one end, said baffle plate having a center bore in which said control rod is slidably mounted, and through bores allowing fluid to flow through said baffle plate.

8. An actuator as recited in claim 7, and further comprising a compression spring mounted between said baffle plate and said one end, with one end of said spring fastened to said control rod and another end abutting said one end.

9. An actuator as recited in claim 8, and further comprising that said through bores of said control piston and said through bores of said baffle plate are not aligned, such that when said control piston abuts said baffle plate said through bores of said control piston are blocked by said baffle plate, preventing fluid flow through said control piston.

* * * * *